UNITED STATES PATENT OFFICE.

EDMUND G. ROBINSON, OF MONTCLAIR, NEW JERSEY, ASSIGNOR TO E. I. du PONT de NEMOURS AND COMPANY, OF WILMINGTON, DELAWARE, A CORPORATION OF DELAWARE.

FIREPROOF COMPOSITION.

1,310,841.     Specification of Letters Patent.     Patented July 22, 1919.

No Drawing.     Application filed February 25, 1918. Serial No. 218,990.

*To all whom it may concern:*

Be it known that I, EDMUND G. ROBINSON, of Montclair, in the county of Essex, and in the State of New Jersey, have invented a certain new and useful Improvement in Fireproof Compositions, and do hereby declare that the following is a full, clear, and exact description thereof.

My invention relates particularly to compositions designed for coating surfaces with films of various kinds, but especially compositions containing cellulose acetate and fireproofing constituents.

The object of my invention is to provide compositions of the above character which will effectively withstand ignition under the conditions to which they are subjected in actual practice.

A further object is to provide compositions of this character which are especially applicable for use in coating airplanes.

Particularly the object of my invention is to provide compositions of this nature which will prevent ignition of the airplane surfaces beneath coatings of such compositions, as for example when gasolene or other inflammable liquids are dropped upon the coated surfaces and ignited thereon. That is to say, the object of my invention is to provide such coating compositions which will protect the airplanes coated thereby from ignition by a larger quantity of burning gasolene on the coated surfaces than surfaces coated with previous coating compositions would withstand.

A further object is to provide compositions of this nature which are waterproof, have a low resistance to the air, and which provide the necessary strength and shrinkage after application but without danger of cracking in use.

Still another object of my invention is to provide fireproof substances for use in compositions of this character which will give off gases, as for example, ammonia, or water, as in the case of water of crystallization or water of constitution, under the influence of heat, so as to form a protective blanket thereby to retard combustion and prevent the spread of fire.

Another object is to provide fireproofing substances of this kind which provide a liquid blanket or absorb heat due to physical or chemical changes therein when heated.

A further object is to utilize substances of this character which have a low solubility in water.

Further objects of my invention will appear from the detailed description thereof contained hereinafter.

While my invention is capable of being carried out in many different ways, for the purpose of illustration I shall describe only certain forms of my invention hereinafter.

For example, I may use one of many different fireproofing constituents for the cellulose acetate compositions of the kind hereinabove referred to, but among those which I prefer for this purpose are:

Ammonium magnesium phosphate, $NH_4MgPO_4.6H_2O$.

Ammonium phosphate, $H_2NH_4PO_4$.

Ammonium magnesium arsenate, $MgNH_4AsO_4.6H_2O$.

Ammonium manganese phosphate, $NH_4MnPO_4.H_2O$.

Ammonium manganese arsenate, $MnNH_4AsO_4.6H_2O$.

Other ammonium salts may be used for this purpose, if desired, or other salts adapted to give off such protective gases or liquids.

A coating composition which may be made in accordance with my invention and which is particularly adapted for coating the cloth covering airplanes may be the following:

7% by weight cellulose acetate,
7% by weight ammonium magnesium phosphate,
66% by weight acetone,
20% by weight acetaldol.

Again, as a lacquer, I may use the following composition:

5% by weight cellulose acetate,
5% by weight ammonium magnesium phosphate,
5% by weight of a resin, such as shellac, copal, etc.,
65% by weight acetone,
20% by weight acetaldol.

The proportions in the above compositions may be varied within wide limits. For example, the cellulose acetate may vary from 5 to 10%. However, I prefer to use equal parts of cellulose acetate and ammonium magnesium phosphate. The latter is insoluble in water and when heated gives off ammonia and water of crystallization and water of constitution. The ammonia and water of crystallization and constitution provide smothering gases. The water acts also as a blanket and absorbs heat due to the physical and chemical change in liberating the water of crystallization and constitution. The liberation of the water of crystallization and constitution absorbs heat and the vaporization of the water thus liberated also results in the absorption of heat.

Any further additional constituents of any desired character may be added, if desired, to the above compositions. Various solvent mixtures may be used, as for example, solvents including ethyl acetate, methyl acetate and methyl acetone as the solvent constituents, and benzol, toluol and benzin as diluents. For example, I may add thereto 30% by weight of any of the above mentioned diluents. Also, any proportion of pigments and oils, as for example, zinc oxid or ivory black, and oil of cedar or oil of pennyroyal may be added, if desired.

In order to provide compositions giving off other protective gases than ammonia, I may substitute for the ammonium compounds in the above compositions magnesium carbonate or calcium carbonate which give off carbon dioxid under the influence of heat. Furthermore, ammonium phosphate which is above referred to, when used, not only gives off ammonia, but provides a liquid blanket of phosphoric acid which retards the fire.

While I have described my invention above in detail, I wish it to be understood that many changes may be made therein without departing from the spirit of the invention.

I claim:

1. A composition containing cellulose acetate and a fire-retarding constituent adapted to give off a fire-smothering gas containing water vapor.

2. A coating composition containing cellulose acetate and a fire-retarding constituent adapted when heated to give off a fire-smothering gas containing water vapor and ammonia.

3. A composition containing cellulose acetate and a fire-retarding constituent adapted to form a fire-smothering blanket.

4. A coating composition containing cellulose acetate and a fire-retarding constituent adapted when heated to form a fire-smothering blanket.

5. A composition comprising cellulose acetate and a fire-retarding constituent containing water of crystallization and adapted when heated to give off said water of crystallization.

6. A composition containing cellulose acetate and a fire-retarding constituent adapted to absorb heat due to the chemical change therein when heated.

7. A coating composition containing cellulose acetate and a fire-retarding constituent adapted when heated to decompose to form a substance having a large heat-absorbing capacity.

8. A composition containing cellulose acetate and a fire-retarding constituent adapted to absorb heat due to the physical change therein when heated.

9. A composition containing cellulose acetate and ammonium magnesium phosphate.

10. A coating composition containing cellulose acetate and an ammonium metal phosphate.

11. A coating composition containing cellulose acetate and a water-insoluble fire-retarding constituent adapted when heated to liberate a fire-smothering substance.

12. A composition containing cellulose acetate and a water-insoluble fire-retarding constituent adapted to give off a fire-smothering gas.

13. A composition containing cellulose acetate and a water-insoluble fire-retarding constituent adapted to give off a fire-smothering gas containing ammonia.

14. A composition containing cellulose acetate and a water-insoluble fire-retarding constituent adapted to form a fire-smothering blanket.

In testimony that I claim the foregoing I have hereunto set my hand.

EDMUND G. ROBINSON.

Witnesses:
H. F. HOLTON,
E. L. KREBS.

Copies of this patent may be obtained for five cents each, by addressing the "Commissioner of Patents, Washington, D. C."